US008782025B2

(12) United States Patent
Swenson

(10) Patent No.: US 8,782,025 B2
(45) Date of Patent: Jul. 15, 2014

(54) SYSTEMS AND METHODS FOR ADDRESS INTELLIGENCE

(75) Inventor: Karen Swenson, Bedford, NH (US)

(73) Assignee: IMS Software Services Ltd., Wilmington, DE (US)

( * ) Notice: Subject to any disclaimer, the term of this patent is extended or adjusted under 35 U.S.C. 154(b) by 749 days.

(21) Appl. No.: 12/721,280

(22) Filed: Mar. 10, 2010

(65) Prior Publication Data

US 2010/0235315 A1    Sep. 16, 2010

Related U.S. Application Data

(60) Provisional application No. 61/158,793, filed on Mar. 10, 2009.

(51) Int. Cl.
   *G06F 17/30*    (2006.01)

(52) U.S. Cl.
   USPC ............ 707/705; 707/692; 707/748; 707/803

(58) Field of Classification Search
   CPC .............. G06F 17/30286; G06Q 40/02; Y10S 707/99931; Y10S 707/944
   USPC .................................. 707/705, 692, 748, 803
   See application file for complete search history.

(56) References Cited

U.S. PATENT DOCUMENTS

| 3,351,920 A | 11/1967 | Harper et al. |
|---|---|---|
| 3,610,159 A | 10/1971 | Fickenscher et al. |
| 3,623,006 A | 11/1971 | Balakian et al. |
| 3,881,097 A | 4/1975 | Lehmann et al. |
| 5,041,921 A | 8/1991 | Scheffler |
| 5,598,276 A | 1/1997 | Cookson et al. |
| 5,913,013 A | 6/1999 | Abecassis |
| 6,016,038 A | 1/2000 | Mueller et al. |
| 6,026,304 A | 2/2000 | Hilsenrath et al. |
| 7,099,878 B2 * | 8/2006 | Bruce et al. ........................... 1/1 |
| 7,254,549 B1 * | 8/2007 | Bansal et al. ................. 705/26.1 |
| 7,305,404 B2 | 12/2007 | Owens et al. |
| 7,512,612 B1 | 3/2009 | Akella et al. |
| 7,676,459 B2 * | 3/2010 | Carone et al. .......... 707/999.004 |
| 8,589,286 B1 * | 11/2013 | Kornegay et al. ................ 705/38 |

(Continued)

FOREIGN PATENT DOCUMENTS

| EP | 0214718 | 3/1987 |
|---|---|---|
| WO | WO9855947 | 12/1998 |

(Continued)

OTHER PUBLICATIONS

International Search Report issued in International Patent Application Serial No. PCT/US10/26818, mail date May 10, 2010.

*Primary Examiner* — Cheryl Lewis
(74) *Attorney, Agent, or Firm* — Fish & Richardson P.C.

(57) ABSTRACT

Systems and methods for determining the present status of at least one occupancy of one or more individuals based on one or more occupancy data sources are described. The techniques include obtaining the at least one occupancy of said one or more individuals from said one or more sources; computing a score of said at least one occupancy by a computer processor based on the currency and the relative trustworthiness of said one or more sources; and determining said present status of said at least one occupancy based on said computed score. The techniques can also include presenting the at least one occupancy in a user readable format.

17 Claims, 15 Drawing Sheets

| FIRST_NAME | LAST_NAME | ADDR_1 | ADDR_2 | CITY | STATE | ZIP_5 | Deliverability | ADDR_IND | ADDR_RANK | ADDR_LOCATION_DESC | ADDR_CATEGORY |
|---|---|---|---|---|---|---|---|---|---|---|---|
| SOONTORN | THRUPKAEW | 2 TERMINAL DR | STE 8 | EAST ALTON | IL | 62024 | High | P | 10 | Office | Outpatient |
| SOONTORN | THRUPKAEW | 9831 S WESTERN AVE | NULL | CHICAGO | IL | 60643 | High | O | -2 | Office | Outpatient |
| JOHN | CARTER | 2407 HELTON DR | NULL | FLORENCE | AL | 35630 | High | P | 10 | Office | Outpatient |
| JOHN | CARTER | PO BOX 10000 | NULL | FLORENCE | AL | 35631 | High | T | 5 | PO BOX | NULL |
| JOHN | CARTER | 203 AVALON AVE | NULL | MUSCLE SHOALS | AL | 35661 | High | O | -4 | Office | Outpatient |
| JOHN | CARTER | PO BOX 10 | NULL | FLORENCE | AL | 35631 | High | A | 8 | PO BOX | NULL |
| PAUL | SHASHY | 29 L V STABLER DR | NULL | GREENVILLE | AL | 36037 | High | A | 8 | Office | Institutional |
| PAUL | SHASHY | 1722 PINE ST | NULL | MONTGOMERY | AL | 36106 | High | P | 10 | Office | Outpatient |
| ABDEL | NOURELDIN | 1315 GLENMORE CT | NULL | INVERNESS | IL | 60010 | High | P | 9 | Office | Other |
| ABDEL | NOURELDIN | PO BOX 87904 | NULL | CAROL STREAM | IL | 60188 | High | A | 8 | PO BOX | NULL |
| EMEKA | ANUMBA | 2245 WINCHESTER AVE | STE 3 | ASHLAND | KY | 41101 | High | T | 2 | Office | Outpatient |
| EMEKA | ANUMBA | 950 EAGLES LANDING PKWY | STE 151 | STOCKBRIDGE | GA | 30281 | High | A | 8 | Office | Other |
| EMEKA | ANUMBA | PO BOX 1238 | NULL | ASHLAND | KY | 41105 | High | O | -2 | PO BOX | NULL |
| EMEKA | ANUMBA | 4000 GRANDVIEW DR | NULL | ASHLAND | KY | 41101 | High | O | -2 | Office | Other |
| JOHN | FRIEDMAN | 90 PRESIDENTIAL PLZ | NULL | SYRACUSE | NY | 13202 | High | A | 8 | Office | Outpatient |
| JOHN | FRIEDMAN | 800 S WILBUR AVE | NULL | SYRACUSE | NY | 13204 | High | A | 8 | Office | Residential (NH, HH, etc.) |
| JOHN | FRIEDMAN | 750 E ADAMS ST | NULL | SYRACUSE | NY | 13210 | High | P | 9 | Office | Institutional |
| JOHN | FRIEDMAN | SYRACUSE DEVELOPMENTAL CTR | NULL | SYRACUSE | NY | 13204 | Unknown | T | 5 | Office | Other |

(56) References Cited

U.S. PATENT DOCUMENTS

| | | |
|---|---|---|
| 2002/0032612 A1 | 3/2002 | Williams et al. |
| 2002/0082892 A1 | 6/2002 | Raffel et al. |
| 2002/0097651 A1 | 7/2002 | Watt et al. |
| 2002/0136206 A1 | 9/2002 | Robohm |
| 2002/0165739 A1 | 11/2002 | Guyan et al. |
| 2003/0009570 A1 | 1/2003 | Moskowitz et al. |
| 2003/0033308 A1 | 2/2003 | Patel et al. |
| 2003/0112809 A1 | 6/2003 | Bharali et al. |
| 2003/0172053 A1 | 9/2003 | Fairweather |
| 2003/0196094 A1 | 10/2003 | Hillis et al. |
| 2004/0059705 A1 | 3/2004 | Wittke et al. |
| 2004/0134982 A1 | 7/2004 | Jouvin et al. |
| 2004/0143710 A1 | 7/2004 | Walmsley et al. |
| 2004/0181425 A1 | 9/2004 | Schwerin-Wenzel et al. |
| 2005/0021523 A1 | 1/2005 | Farag |
| 2005/0149741 A1 | 7/2005 | Humbel |
| 2005/0180753 A1 | 8/2005 | Wirth et al. |
| 2005/0188071 A1 | 8/2005 | Childress et al. |
| 2005/0234913 A1 | 10/2005 | Carone et al. |
| 2005/0257083 A1 | 11/2005 | Cousins |
| 2005/0289508 A1 | 12/2005 | Illowsky et al. |
| 2006/0062363 A1 | 3/2006 | Albrett et al. |
| 2006/0095586 A1 | 5/2006 | Adelman et al. |
| 2006/0200487 A1 | 9/2006 | Adelman et al. |
| 2006/0212386 A1* | 9/2006 | Willey et al. .................... 705/38 |
| 2007/0008884 A1 | 1/2007 | Tang |
| 2007/0038524 A1 | 2/2007 | Hull et al. |
| 2007/0168675 A1 | 7/2007 | Wahlberg et al. |
| 2007/0244627 A1 | 10/2007 | Boss et al. |
| 2008/0052414 A1 | 2/2008 | Panigrahi et al. |
| 2008/0109845 A1 | 5/2008 | Hengel et al. |
| 2008/0228040 A1 | 9/2008 | Thompson |
| 2008/0285886 A1 | 11/2008 | Allen |
| 2009/0132395 A1* | 5/2009 | Lam et al. ...................... 705/30 |
| 2009/0232112 A1 | 9/2009 | Trainin et al. |
| 2009/0307206 A1 | 12/2009 | Morrison et al. |
| 2010/0070448 A1* | 3/2010 | Omoigui ........................ 706/47 |

FOREIGN PATENT DOCUMENTS

| | | |
|---|---|---|
| WO | WO0050974 | 8/2000 |
| WO | WO0180238 | 10/2001 |
| WO | WO03038562 | 5/2003 |
| WO | WO2004044697 | 5/2004 |
| WO | WO2004068941 | 8/2004 |
| WO | WO2005120835 | 12/2005 |
| WO | WO2006083694 | 8/2006 |
| WO | WO2009085744 | 7/2009 |

* cited by examiner

| PROFESSIONAL | | |
|---|---|---|
| IMS_ID = 0003485 | | John Doe |
| IMS_ID = 0547632 | | Jane Doe |

| ADDRESS OCCUPANCY | | |
|---|---|---|
| IMS_ID | RFM_ADDR_KEY | |
| 0003485 | SW123456789 | 123 Main Street Bedford NH 03110 |
| 0547632 | AM987654321 | 456 West Blvd Plymouth Meeting, PA 00011 |

| ADDRESS_SOURCE TAG | | | | |
|---|---|---|---|---|
| IMS_ID | RFM_ADDR_KEY | SOURCE | START_DT | CHANGE_DT |
| 0003485 | SW123456789 | DEA | 20081215 | 20090115 |
| 0547632 | AM987654321 | DEA | 20090115 | 20090115 |

FIG.1A

| PROFESSIONAL | | |
|---|---|---|
| IMS_ID = 0003485 | | John Doe |
| IMS_ID = 0547632 | | Jane Doe |

| ADDRESS OCCUPANCY | | |
|---|---|---|
| IMS_ID | RFM_ADDR_KEY | |
| 0003485 | SW123456789 | 123 Main Street Bedford NH 03110 |
| 0003485 | BP675849281 | 750 East Street Manchester NH 03110 |
| 0547632 | AM987654321 | 456 West Blvd Plymouth Meeting, PA 00011 |

| ADDRESS_SOURCE TAG | | | | |
|---|---|---|---|---|
| IMS_ID | RFM_ADDR_KEY | SOURCE | START_DT | CHANGE_DT |
| 0003485 | SW123456789 | DEA | 20081215 | 20090115 |
| 0003485 | BP675849281 | DEA | 20090214 | 20090214 |
| 0547632 | AM987654321 | DEA | 20090115 | 20090214 |
| 0003485 | BP675849281 | AMA | 20090214 | 20090210 |

FIG.1B

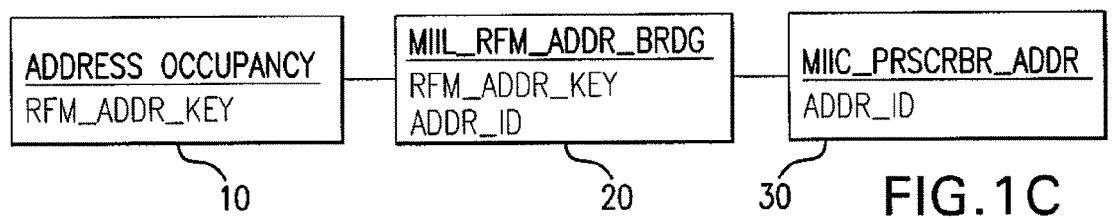

FIG.1C

RFM_ADDR_EXT_SOURCES
ETM KEY
IMS_ID
RFM_ADD_KEY
ADDR_ID
SRC_NO (<> '00099')
SRC_DESC
START_DT
CHANGE_DT

*approval_age_start*
*approval_age_change*
*ext_points\**

FIG.3 approval_age (@input_date, @today)

0 = missing/invalid or 1900
1 = 1 - 45 days (1 mo*)
2 = 46 - 90 days (2-3 mo*)
3 = 91 - 180 days (4-6 mo)
4 = 181 - 365 days (7-12 mo)
5 = 366 - 546 days (13- 18 mo)
6 = 547 - 730 days (19- 24 mo)
7 = 731 or more (25+ mo)

FIG.4

| src_no | src_desc | approval_age | ext_points |
|--------|----------|--------------|------------|
| 00001 | AMA | 1 | 10 |
| 00001 | AMA | 2 | 7 |
| 00001 | AMA | 3 | 2 |
| 00001 | AMA | 4 | -3 |
| 00001 | AMA | 5 | -5 |
| 00001 | AMA | 6 | -10 |
| 00001 | AMA | 7 | -10 |
| 00010 | DEA | 1 | 8 |
| 00010 | DEA | 2 | 6 |
| 00010 | DEA | 3 | 2 |
| 00013 | NPI | 1 | 14 |
| 00013 | NPI | 2 | 9 |
| 00013 | NPI | 3 | 2 |
| 00013 | NPI | 4 | -3 |

FIG.5

| Score | Rank | Indicator |
|---|---|---|
| >= 25 | 5 | A |
| 15 - 24 | 4 | A |
| 10 - 14 | 3 | A |
| 5 - 9 | 2 | A |
| 1 - 4 | 1 | T |
| 0 | 0 | U |
| -4 to -1 | -1 | O |
| -5 to -9 | -2 | O |
| -10 to -14 | -3 | O |
| -15 to -24 | -4 | O |
| <= -25 | -5 | O |

FIG.6

RFM_intelligence
ims_id
addr_id
RFM_ADDR_KEY
RFM_deliverability
RFM_address_loc
rfm_address_recency
source_cat (I or E)
occupancy_in_core (Y or N)
pt_address_loc
ext_addr_ind
ext_score
ext_addr_rank

FIG.7

| SRC_CODE | SRC | approval_age | INT_IND | INT_SCORE |
|---|---|---|---|---|
| 101 | PHX Affiliation – RT | 1 | A | 20 |
| 102 | PHX Affiliation – FL | 1 | A | 20 |
| 103 | PHX Affiliation – RT | 2 | A | 16 |
| 104 | PHX Affiliation – FL | 2 | A | 16 |
| 211 | ADDR_TYPE – PO – MANUAL_VRFYCATN_DT | 1 | A | 15 |
| 212 | ADDR_TYPE – O – MANUAL_VRFYCATN_DT | 1 | A | 15 |
| 213 | ADDR_TYPE – PO – VALIDATE_DT | 1 | A | 15 |
| 214 | ADDR_TYPE – O – VALIDATE_DT | 1 | A | 15 |
| 251 | ADDR_TYPE – PO – MANUAL_VRFYCATN_DT | 5 | A | 7 |
| 252 | ADDR_TYPE – PO – MANUAL_VRFYCATN_DT | 5 | A | 7 |
| 253 | VALIDATE_DT | 5 | A | 7 |
| 254 | ADDR_TYPE – O – VALIDATE_DT | 5 | A | 7 |
| 255 | ADDR_TYPE – PO – INSERT_DT | 5 | A | 6 |
| 256 | ADDR_TYPE – O – INSERT_DT | 5 | A | 6 |

FIG.9B

| INT_Score | INT_RANK | INT_IND |
|---|---|---|
| ≥15 | 5 | A |
| 11–14 | 4 | A |
| 7–10 | 3 | A |
| 3–6 | 2 | A |
| 1–2 | 1 | A |
| 0 | 0 | U |

FIG.9C

| ADDR_SCORE | ADDR_RANK | ADDR_IND |
|---|---|---|
| >=25 | 10 | P |
| 16-27 | 9 | P |
| 10-15 | 8 | A |
| 6-9 | 7 | A |
| 5 | 6 | A |
| 3-4 | 5 | T |
| 1-2 | 4 | T |
| 0 | 3 | T |
| -1 to -3 | 2 | T |
| -4 | 1 | O |
| -5 | -1 | O |
| -9 to -6 | -2 | O |
| -14 to -10 | -3 | O |
| -15 to -26 | -4 | O |
| >=-25 and not a violation of an 'expiration' quality check | -5 | O |
| = -25 and a violation of an 'expiration' quality check | -6 | D |

FIG.10B

| FIRST_NAME | LAST_NAME | ADDR_1 | ADDR_2 | CITY | STATE | ZIP_5 | Deliverability | ADDR_IND | ADDR_RANK | ADDR_LOCATION_DESC | ADDR_CATEGORY |
|---|---|---|---|---|---|---|---|---|---|---|---|
| SOONTORN | THRUPKAEW | 2 TERMINAL DR | STE 8 | EAST ALTON | IL | 62024 | High | P | 10 | Office | Outpatient |
| SOONTORN | THRUPKAEW | 9831 S WESTERN AVE | NULL | CHICAGO | IL | 60643 | High | O | -2 | Office | Outpatient |
| JOHN | CARTER | 2407 HELTON DR | NULL | FLORENCE | AL | 35630 | High | P | 10 | Office | Outpatient |
| JOHN | CARTER | PO BOX 10000 | NULL | FLORENCE | AL | 35631 | High | T | 5 | PO BOX | NULL |
| JOHN | CARTER | 203 AVALON AVE | NULL | MUSCLE SHOALS | AL | 35661 | High | O | -4 | Office | Outpatient |
| JOHN | CARTER | PO BOX 10 | NULL | FLORENCE | AL | 35631 | High | A | 8 | PO BOX | NULL |
| PAUL | SHASHY | 29 L V STABLER DR | NULL | GREENVILLE | AL | 36037 | High | A | 8 | Office | Institutional |
| PAUL | SHASHY | 1722 PINE ST | NULL | MONTGOMERY | AL | 36106 | High | P | 10 | Office | Outpatient |
| ABDEL | NOURELDIN | 1315 GLENMORE CT | NULL | INVERNESS | IL | 60010 | High | P | 9 | Office | Other |
| ABDEL | NOURELDIN | PO BOX 87904 | NULL | CAROL STREAM | IL | 60188 | High | A | 8 | PO BOX | NULL |
| EMEKA | ANUMBA | 2245 WINCHESTER AVE | STE 3 | ASHLAND | KY | 41101 | High | T | 2 | Office | Outpatient |
| EMEKA | ANUMBA | 950 EAGLES LANDING PKWY | STE 151 | STOCKBRIDGE | GA | 30281 | High | A | 8 | Office | Other |
| EMEKA | ANUMBA | PO BOX 1238 | NULL | ASHLAND | KY | 41105 | High | O | -2 | PO BOX | NULL |
| EMEKA | ANUMBA | 4000 GRANDVIEW DR | NULL | ASHLAND | KY | 41101 | High | O | -2 | Office | Other |
| JOHN | FRIEDMAN | 90 PRESIDENTIAL PLZ | NULL | SYRACUSE | NY | 13202 | High | A | 8 | Office | Outpatient |
| JOHN | FRIEDMAN | 800 S WILBUR AVE | NULL | SYRACUSE | NY | 13204 | High | A | 8 | Office | Residential (NH, HH, etc.) |
| JOHN | FRIEDMAN | 750 E ADAMS ST | NULL | SYRACUSE | NY | 13210 | High | P | 9 | Office | Institutional |
| JOHN | FRIEDMAN | SYRACUSE DEVELOPMENTAL CTR | NULL | SYRACUSE | NY | 13204 | Unknown | T | 5 | Office | Other |

FIG.14

SYSTEMS AND METHODS FOR ADDRESS INTELLIGENCE

CROSS-REFERENCE TO RELATED APPLICATIONS

This application claims priority to U.S. Provisional Application No. 61/158,793 filed on Mar. 10, 2009 and is incorporated by reference in its entirety.

BACKGROUND

A compilation of addresses of potential and existing customers is an important asset for any company that uses traditional methods to identify, manage and allocate the multiple types of addresses that are configured for a professional to meet multiple operational needs for customer management, personal and non-personal communications. However, it can be a daunting task to keep a large compilation of addresses up-to-date and accurate.

A person often has multiple addresses of different types or categories. These addresses can enter into private or public records through many channels, for example, state or federal government authorizations, licensing or certification, membership in professional associations, registration of real property or motor vehicles, posting in advertisements, etc. After the addresses become available in these original sources, they can later be transferred to, shared or purchased by myriads of organizational entities including the government, communities, or commercial vendors (these become "secondary sources" for the addresses). The reliability of some of these sources can be questionable, as they are typically not actively monitored. For example, when a person changes his or her address, the change often is likely reflected in only a few of the above sources at the outset (and can percolate through other sources at different times). As a result, many sources, especially the secondary sources, can contain a significant portion of outdated addresses.

A user may want to gather the addresses of the persons of interest from various sources. However, the use of multiple address sources does not guarantee a broader reach to the targeted audience, but instead can create confusion and cause more waste. This is due to not only the varying reliability of the individual sources, but also the conflicts or inconsistencies of the addresses provided by the different sources. For example, an address can be present in one source, but not another; a person can have multiple office addresses reported by different sources, yet no information is available as to which one is more current. Without further analysis or investigation, a user of such addresses will not be able to use them effectively.

Therefore, there is a need for systems and methods that can assess the currency and reliability of addresses obtained from various sources, as well as to reconcile the inconsistencies of a large amount of addresses obtained from different sources. There is also a need for presenting the analyzed addresses to a user in an understandable format to allow the user to more effectively use the addresses.

SUMMARY

Systems and methods for determining the present status of at least one occupancy of one or more individuals based on one or more occupancy data sources are described. In some embodiments, the techniques include obtaining the at least one occupancy of said one or more individuals from said one or more sources; computing a score of said at least one occupancy by a computer processor based on the currency and the relative trustworthiness of said one or more sources; and determining said present status of said at least one occupancy based on said computed score. The techniques can also include presenting the at least one occupancy in a user readable format.

In some embodiments, the occupancy is obtained from at least one external source. For such an embodiment, computing the score for an occupancy can include obtaining an age of the occupancy, assigning a weight point to each of one or more instances of the occupancy based on the age and the relative trustworthiness of the at least one external source, and obtaining a score of the occupancy by summing up all of the weights of the one or more instances of the occupancy.

In some embodiments, the score of an occupancy is an overall score and computing the score includes combining an internal score and an external score of an occupancy.

In some embodiments, the techniques further include additional verification or validation based on one or more criteria for supplementing missing information of an occupancy, correcting an error existent in an occupancy as reported, validating an occupancy, updating the present status of an occupancy, and/or resolving a conflict between multiple occupancies associated with a person.

BRIEF DESCRIPTION OF THE DRAWINGS

For a more complete understanding of example embodiments of the described subject matter and its advantages, reference is now made to the following description, taken in conjunction with the accompanying drawings, in which:

FIGS. 1A and 1B depict structures of three database tables and some occupancy data as obtained by a procedure according to some embodiments of the described subject matter.

FIG. 1C depicts a diagram for linking a database table in an external source with a database table in an internal source via a bridging table according to some embodiments of the described subject matter.

FIG. 3 depicts a database table relating to computing of the age of an occupancy according to some embodiments of the described subject matter.

FIG. 4 depicts a scheme relating to computing the age of an occupancy according to some embodiments of the described subject matter.

FIG. 5 depicts a scheme for assigning weight points for an occupancy according to some embodiments of the described subject matter.

FIG. 6 depicts a scheme relating to deriving a rank and an indicator based on the score of an occupancy according to some embodiments of the described subject matter.

FIG. 7 depicts a database table obtained by processing occupancies received from an external source according to some embodiments of the described subject matter.

FIG. 9B depicts a scheme for incrementing the internal score for an occupancy according to some embodiments of the described subject matter FIG. 9C depicts a scheme relating to deriving an internal rank and an internal indicator based on the internal score of an occupancy according to some embodiments of the described subject matter.

FIG. 10B depicts a scheme relating to deriving an overall rank and an overall indicator based on an overall score of an occupancy according to some embodiments of the described subject matter

FIG. 14 depicts a portion of a table containing a number of occupancies presented in a user readable format according to some embodiments of the described subject matter.

DETAILED DESCRIPTION

Figure 2:
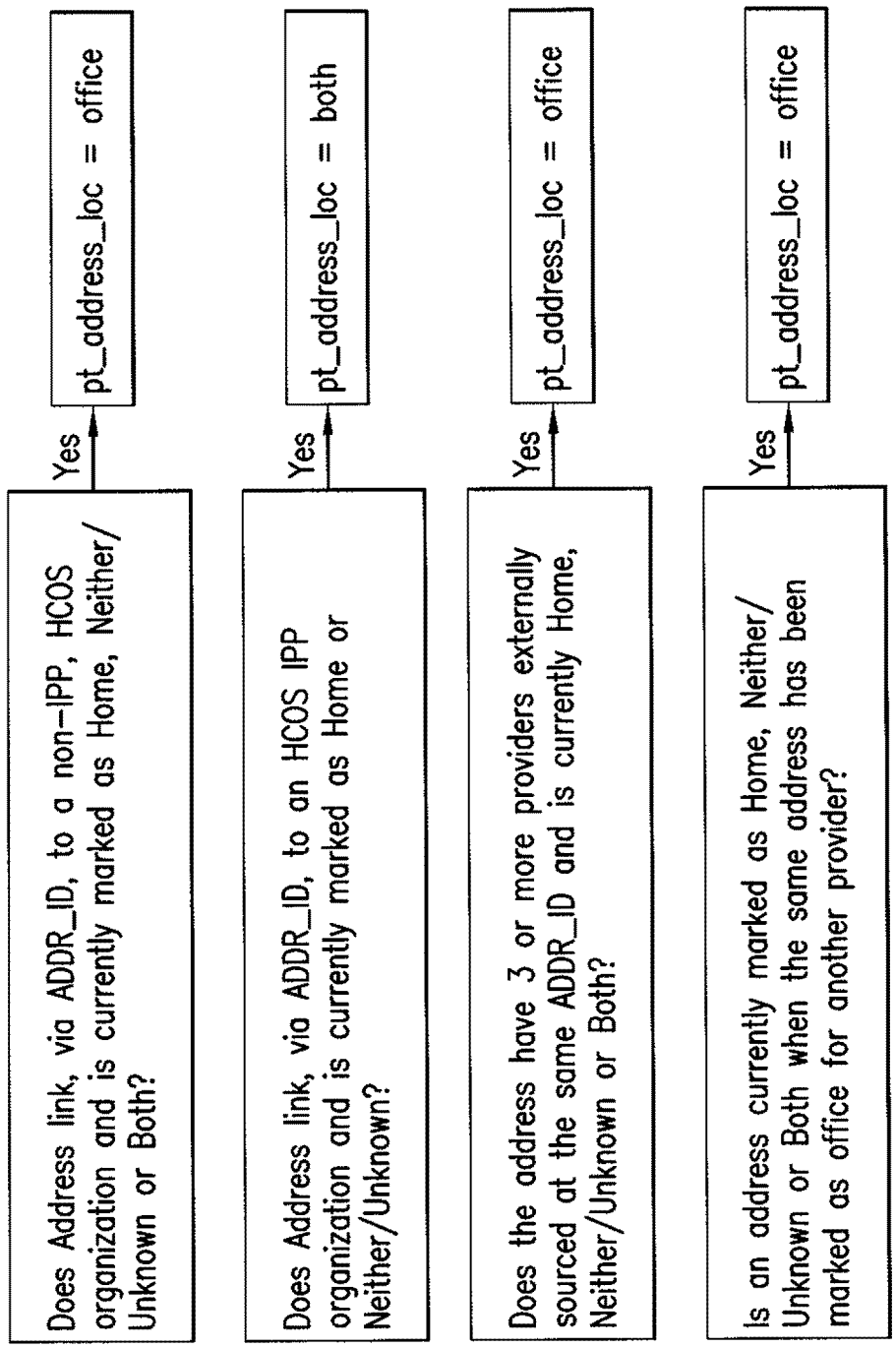
FIG. 2 depicts a diagram for setting flags of address types for occupancies according to some embodiments of the described subject matter.

The described techniques herein include providing a user with one or more addresses of a person of interest. The techniques are hereinafter referred to as the "address intelligence techniques." The address intelligence techniques are based on an analysis of the currency of an occupancy, the source(s) where the occupancy is obtained, as well as an evaluation of the occupancy based on a set of criteria designed using the characteristics of the occupancy. The techniques 'score' an occupancy based on cumulative quantity of the occupancy reported by the various sources as well as the currency and quality of these sources. Such a score can be converted to a rank representing the degree of confidence with respect to currency of the address. In situations where a person has multiple locations, the technique can select the best address or addresses according to the rank, the indicator, or a combination of both. The address intelligence techniques further allow the reconciliation of the inconsistencies existent in large collections of occupancies reported from different sources, thus enabling more effective use of these occupancies.

As used in the present application, the word "person" includes a person whose address(es) is obtained and processed by the address intelligence techniques disclosed in the presently described subject matter. Certain aspects of the described subject matter are illustrated in the context of the healthcare industry where the person of interest can be a healthcare professional, e.g., a physician, an administrative contact of a healthcare organization, etc. The term "person" can include a prescriber who has prescription qualification (e.g., a physician), a mid-level practitioner (e.g. Nurse of Physician's Assistant), or more generally a "professional." The presently described techniques can be applied to persons of any category or industry, and is not limited to persons in the healthcare industry.

The term "service provider" includes an individual or organization that may use the address intelligence techniques described herein to obtain, procedure, and present data for its customer(s).

The term "occupancy" includes a unique combination of an identifier of a person and an address of the person. As a name can be shared by many persons, a person can be represented by a unique identifier, such as SSN#, license number, etc. A person can have multiple different addresses, and they can be of different types (e.g., office, home, mailing, etc.). These different addresses combined with the same person can be referred to as different occupancies associated with the person. Note that one occupancy, e.g., "David Smith, 123 Main Street" can be reported multiple times by different sources. This can be referred to as the multiple instances of an occupancy, rather than different occupancies. An occupancy can include other attributes, such as the affiliation or specialty of a person, or the type or category of an address (e.g., home, office, etc.).

The techniques disclosed in the presently described subject matter include the following: obtaining the at least one occupancy of said one or more individuals from said one or more sources; computing a score of said at least one occupancy by a computer processor based on the currency and the relative trustworthiness of said one or more sources; and determining a present status of said at least one occupancy based on said computed score.

An occupancy can be obtained from one or more external and internal sources. "External sources," as used herein, include sources of occupancies that are not proprietary databases of the service provider. They include but are not limited to: reference files purchased or made publicly available by the Drug Enforcement Agency (DEA), American Medical Association (AMA), American Osteopathic Association (AOA), National Provider Identifier (NPI), State License Number (SLN), Yellow White Pages (YWP), and GM Loadstone (GML). The reference files can be updated periodically, e.g., daily, weekly, or monthly. "Internal sources" include one or more proprietary databases maintained by a service provider, e.g., IMS's primary research databases for professionals: MI CORE™ and PHOENIX™. An occupancy can be obtained from the one or multiple such sources, or combinations thereof. Multiple instances of an occupancy associated with a person can be obtained from the multiple sources. It is understood that internal sources can operate similarly as the external sources. For example, the MI CORE™ database, used throughout the present application merely for illustrative purposes, is organized in a substantially similar fashion as other commercial databases.

Obtaining occupancy data from external sources can take various routes. One such route is through periodically receiving a feed from a vendor which provides occupancy data to the service provider. An example of obtaining occupancies from an external source is illustrated in FIG. 1A, wherein an external source such as the DEA reference file is integrated into REFERENCE FILE MASTER (or "RF MASTER"), a database containing a master collection of external occupancy data, maintained by the service provider. For example, on Jan. 15, 2009, the following addresses are received for one John Doe and one Jane Doe from DEA:

| | | |
|---|---|---|
| A12345678 | John Doe | 123 Main Street Bedford NH 03110 |
| B98765432 | Jane Doe | 456 West Blvd Plymouth Meeting, PA 00011 | where A12345678 and B98765432 are identifiers used by the DEA. A "SOURCE COMPARE" procedure can be run to integrate the data obtained from the DEA file to the PROFESSIONAL, ADDRESS OCCUPANCY, and ADDRESS SOURCE TAG tables in the REFERENCE FILE MASTER, whose structures are illustrated in FIG. 1A. In one exemplary embodiment, the procedure can be performed as follows for each entry received from the DEA:

First, if the person's information is not yet in the REFERENCE FILE MASTER, the person is added to the PROFESSIONAL table. For example, suppose the two entries are first reported by the DEA to the REFERENCE FILE MASTER, the entry relating to John Doe representing a new person. The procedure first creates an entry in the PROFESSIONAL table for John Doe, and then a Postal Standardized entry in the ADDRESS OCCUPANCY table for John Doe at 123 Main Street, Bedford N.H. 03110. Further, John Doe's address can be "source tagged" by creating an entry in the ADDRESS SOURCE TAG table for the address with the 'source' of DEA, and setting a 'start' date and 'change' date to the data of file receipt. As used herein, the start state of an occupancy refers to the date when the occupancy was first reported by an external data source to the service provider; the change date of an occupancy refers to the date when the occupancy was last referenced by an external data source (as seen by the SOURCE COMPARE procedure). For example, if an external source reported an occupancy in the first month, but stop reporting the occupancy in the subsequent two months, the change date of the occupancy at the end of the three-month period would still be the reporting date in the first month. If however, the occupancy was repeatedly reported by a source for three consecutive months, then the change date at the end of the three-month period is the last reporting date of the reference file. The change date is herein also referred to as a 'recency' date.

If the person already exists in the REFERENCE FILE MASTER, the ADDRESS OCCUPANCY table is checked as to whether the address 123 Main Street Bedford N.H. is attached to John Doe. If the address does not already exist, a Postal Standardized entry can be created in the ADDRESS OCCUPANCY table for John Doe at 123 Main Street, Bedford N.H. 03110, and then an entry can be created in the ADDRESS SOURCE TAG table for the address with the 'source' of DEA, and the start date and recency date can be set to the data of file receipt. If the address does exist for John Doe, the ADDRESS SOURCE TAG table can be checked as to whether the address has previously been sourced by the DEA reference file. Again, there are two possibilities (when the address exist for John Doe): if the address has never been sourced by the DEA before, an entry can be created in the ADDRESS SOURCE TAG table for the address with the 'source' of DEA, and the start date and recency date set to the data of file receipt; if the address has been sourced by the DEA before, the entry in the ADDRESS SOURCE TAG table can be updated for the address with the 'source' tag of DEA by re-setting the recency date to the data of file receipt.

The result of this exemplary SOURCE COMPARE procedure and the results visible within the REFERENCE FILE MASTER is illustrated in FIG. 1A.

If further, for example, on Feb. 14, 2009, two address entries were received from DEA about John Doe and Jane Doe, respectively:

| | | |
|---|---|---|
| A12345678 | John Doe | 750 East Street Manchester NH 03110 |
| B98765432 | Jane Doe | 456 West Blvd Plymouth Meeting, PA 00011 |

And on Feb. 10, 2009, an address was received from AMA about John Doe:

A12345678 John Doe 750 East Street Manchester N.H. 03110

The SOURCE COMPARE procedure is repeated on these three entries (all on the same day, or separately, e.g., on the days the respective entries were received). The results are reflected in the relevant tables, as illustrated in FIG. 1B.

Further, in some embodiments, an internal operative database, e.g., MI CORE™, can be configured to link or integrate with REFERENCE FILE MASTER using standard database technologies, as illustrated in FIG. 1C. A subset of REFERENCE FILE MASTER can contain a set of data tables: ADDRESS OCCUPANCY, PROFESSIONAL, and ADDRESS SOURCE TAG. The tables can be linked with occupancy data contained in an internal source, for example, MI CORE™, via a bridging table (e.g., MIIL_RFM_AD-DR_BRDG (20)), which contains an ADDR_ID field being used to reference the key ADDR_ID in a table MIIC_PRSCR-BR_ADDR (30) of the MI CORE™ database, and a RFM_ADDR_KEY field being used to reference a field RFM_ADDR_KEY (a unique address identifier used in REFERENCE FILE MASTER) of a table ADDRESS OCCUPANCY (10) in the REFERENCE FILE MASTER. For a new occupancy reported in REFERENCE FILE MASTER which does not have a previous corresponding ADDR_ID in the internal operative database (i.e., the linking attempt will fail for this occupancy), a new occupancy entry having a unique ADDR_ID can be created in the internal source MI CORE™.

The externally sourced occupancy data does not necessarily solely originate from a third party provider; the occupancies can also be directly collected by the service provider itself into so called "internal sources." Therefore, the internal sources, as previously noted, can also contain occupancy data which are similarly referenced by various external sources. Additionally, the internal sources can include database entry systems that employ manual input of an occupancy on a more individual basis (as opposed to importation of entire occupancy databases), and therefore can contain data that are collected through means other than the automated SOURCE COMPARE procedure, for example, by directly contacting with a physician and obtaining the physician's address, or data relating to information about the physicians other than occupancies, such as affiliations, date of birth, specialties, etc. These data are herein referred to as "internally sourced data," and are typically validated in some ways, the validation techniques including, for example, direct contact by phone, or through comparing some other sources that have high reliability of currency, such as rosters posted on organizational websites. They can be generally maintained in the MI CORE™ and/or PHOENIX™ databases or other internal sources.

Further, in some embodiments, a certain portion of the externally sourced occupancies can be later be verified or validated by an internal procedure, therefore an originally externally sourced occupancy can also acquire attribute(s) that indicates a modification history by an internal verification or validation procedure. These occupancies can be referred to as dually sourced occupancy data; they can still be tagged with the particular external sources from which they are received for processing as detailed below. It is noted that REFERENCE FILE MASTER database includes both the master collection of all the externally sourced data and internally sourced data.

In some embodiments, an occupancy obtained from an external source can optionally be further categorized according to type or category of the address. FIG. 2 illustrates some of the exemplary approaches for the categorization. In one embodiment, a database table field pt_address_loc is used to update the category information based on a set of criteria. For example, if an address link, via the ADDR_ID (in the MI CORE™ database), is found to link to (or associated with) an organization within the IMS Healthcare Organizational Services (HCOS) database, and is currently marked as Home, Unknown, Neither, or Both, then the pt_address_loc field for the occupancy is updated to "office."

In another embodiment, an externally sourced occupancy can then be processed to derive a score based on the currency and relative trustworthiness of the source from which the occupancy data is obtained.

In some embodiments, an "approval age" (or "age") of an occupancy can be derived to reflect the currency of the occupancy. The age can be computed using either or both of the start date and the change date as a reference approval date. The start date and change date can be obtained from a database table designed or assembled to keep track of the update history of the external source reporting the occupancy. An example of such a table is shown in FIG. 3. These calculations can be maintained in a staging database, outside of but linked to the MI CORE™, and can be updated weekly or whenever a new SOURCE COMPARE procedure is run.

It is noted that if multiple instances of the same occupancy are extracted from multiple external sources, a separate start date and change date can be maintained for each instance of the occupancy (i.e., an occupancy will be tracked individually for each source).

In one embodiment, the age of an occupancy can then be derived by assigning a number to the occupancy based on the number of days elapsed since the relevant reference approval date of the specific external source relative to the present date. For example, it can be done in a manner described in FIG. 4, where the age of occupancy data is assigned to a scale of 0-7 depending the days elapsed since the reference approval date, where greater ages correspond to more days elapsed.

In some embodiments, a weight point can then be assigned to an occupancy based on the age and the relative trustworthiness of the source from which the occupancy is obtained. For example, greater positive points can be used to represent occupancy data having a "younger" age, which indicates more reliability and better currency of the occupancy. Smaller positive points or negative points are assigned to an older occupancy. Some sources are more trustworthy and therefore an occupancy having a certain age obtained from these sources is assigned a greater weight point as compared to an occupancy having the same age obtained from other sources. The relative trustworthiness of a source can be assessed by the type of the source, e.g., whether it has a government mandated update procedures, or by collecting a portion of occupancy data from the source and performing statistical or manual validation. An illustrative weight point assignment scheme is presented in FIG. 5, where src_no represents the identifier of an external source, and the ext_points represent the weight points assigned based on the source and recency. Since the AMA database is assessed to have a greater trustworthiness compared to DEA, an occupancy having an age of 1 is assigned 10 weight points, as opposed to the 8 points assigned to an occupancy having the same age but obtained from the DEA database.

In certain embodiments, a score is further derived for an occupancy based on the weight point(s) given to the occupancy from each of the one or more external sources from which the occupancy is obtained. If there are multiple instances of the occupancy from difference sources, the score can be derived by summing up the individual weight points assigned to each instance of the occupancy associated with the person. If there is only one instance of the occupancy, the score can be the same as the weight point assigned to such an occupancy.

In some embodiments, an indicator can be computed for or assigned to an occupancy based on the score of the occupancy. The indicator can reflect the present status of the occupancy. The indicator can be 'P' (for "preferred active"), 'A' (for "active"), 'T' (for "transitional"), 'U' (for 'unknown'), 'O' (for "old"), and 'D' (for "deleted"), reflecting in a decreasing order of currency. For convenience, the status indicators 'P' and 'A' are called high-end indicators. In some embodiments, a rank can be further assigned to an occupancy based on the score of the occupancy.

FIG. 6 outlines an illustrative scheme for assigning indicator values and ranks based on the calculated score of an occupancy. For example, 'A' can be assigned to an occupancy having a score greater than 5, 'T' can be assigned to an occupancy having a score between 1-4, 'U' can be assigned to an occupancy having a score of 0, and any occupancy having a score less than or equal to −1 is assigned as "Old" (O). Further, a rank can be derived by converting the score, which can have a rather large numerical value (e.g., in the negative tens to the positive tens), into an integer in a smaller range, e.g., in the range of −10 to −10, for the purpose of a more intuitive presentation to a user: higher ranks signifies higher degree of confidence with respect to currency of the occupancy, and therefore generally correlates to high-end indicators such as 'P' or 'A.' It should be understand that any number of indicators and ranges of ranks can be used; the above is provided merely for illustrative purposes and is not meant to provide a limitation of the described subject matter.

It is noted that the above translation from age and source of an occupancy to the rank of occupancy is suitable for the majority of occupancies. However, in some embodiments, there are some differences for situations where an address is sourced by the SLN. Generally, three custom formulas can be used depending on whether the occupancy is sourced by SLN, i.e., (1) solely by SLN; (2) by non-SLN sources only; and (3) by SLN and another trusted source. These formulas apply (+) and (−) points on top of the base score as determined by the source, the approval age, and the number of sources reporting an occupancy. For example, if the occupancy is obtained solely from SLN, the weight points are adjusted 'less harshly' for occupancies with older recency dates, because the SLN files are not fully refreshed monthly, but instead, quarterly. Other reference files run monthly and occupancies older than 45 days are treated with increasing skepticism the older the recency date. If the occupancy is obtained from SLN and another trusted source, such as a source where approval_age=1 is assigned 8 or greater points, then the 'negative SLN' points are disregarded.

In some embodiments, the above derived score, indicator and rank for an externally sourced occupancy can be assembled and stored into a table. FIG. 7 illustrates the structure of such a table, named "RFM_intelligence." The table can be used for further processing needs. For example, at the next SOURCE COMPARE procedure, if an occupancy is dropped from the newly received external source file(s), then the new score, indicator, and rank of the occupancy can be computed according to the steps outlined above using the saved information from this table, and then stored back in this table to replace the corresponding previous values.

The above noted score, rank, indicator of an occupancy can refer to an external score, rank, and indicator, as they are derived solely from the quality and recency of an external source(s). As discussed hereafter, an internal score, rank, and indicator can be derived from internal validation and/or update history of an occupancy, which occupancy can be either externally sourced or internally sourced.

In some embodiments, after occupancy data are obtained (either from internal or external sources) and processed, one or more additional quality check steps can be performed to further improve the accuracy and reliability of the occupancy data before presenting them to a user. Collectively, these quality check steps are referred to as the quality check technique, or simply the quality check. The quality check can be incorporated into the address intelligence techniques by refining the score, rank, and/or indicator of an occupancy to make these parameters more realistically reflect the currency and the confidence of the currency of the occupancy. The quality check technique can have one or more of the following features: to supplement missing information for an occupancy, to resolve conflicts of multiple occupancies associated with a person, to update the present status of an occupancy, to correct an error contained in an occupancy as reported from an external source(s), and to validate or confirm an occupancy.

Further details of an exemplary quality check technique are illustrated as follows. The quality check technique can start with loading a database table containing occupancy data. The table can be an expanded database table formed by linking occupancy data from an internal source (e.g., an address table core_address_work_1, denormalized, from the MI CORE™ database) and an external source (e.g., a table of REFERENCE FILE MASTER). A Street Front ID, which can be an identifier for the street front portion of the address of an occupancy (e.g., an address with the suite/apartment/room number omitted), can be derived from the MIIC_ADDR table and included in the expanded database. Some attributes from REFERENCE FILE MASTER that may be of interest to a user can also be included in the expanded table. One of such attributes is "deliverability" which reflects the likelihood that a mail can be correctly delivered to the address. Thereafter, some key variables for the quality check technique are initialized with default values as follows.

| | | |
|---|---|---|
| INT_IND = 'U' | INT_SCORE = 0 | INT_RANK = 0 |
| EXT_IND = 'U' | EXT_SCORE = 0 | EXT_RANK = 0 |
| ADDR_IND = 'U' | ADDR_SCORE = 0 | ADDR_RANK = 0 |
| NEG_CODE = 0 | | | wherein INT_IND represents the internal indicator, INT_SCORE represents the internal score, INT_RANK represents the internal rank; EXT_IND represents the external indicator, EXT_SCORE represents the external score, EXT_RANK represents the external rank; ADDR_IND represents the overall indicator, ADDR_SCORE represents the overall score, and ADDR_RANK represents the overall rank ADDR_IND is also abbreviated by IND. NEG_CODE is a code designed for internal auditing purpose (e.g., to identify the point where the quality check terminates). As used herein, the internal score, internal rank, and internal indicator are attributes of an occupancy (either internally sourced or externally sourced) that can be modified based on some criteria further explained below.

In one embodiment, the quality check technique includes one or more testing of conditions for an occupancy. This technique can be generally viewed as sending an occupancy through a series of checkpoints, and at each checkpoint, checking the occupancy against a given criterion (or query). If the occupancy does not satisfy the criterion, its indicator value (such as an internal indicator for purely internally sourced occupancy, or an external indicator for externally sourced occupancy without internal support, or an overall indicator for dually sourced occupancy) is updated, a NEG_CODE is set, and the quality check terminates. Otherwise, the occupancy is sent down to one or more other checkpoints for further inspection. It is noted, however, the specific order, number, or specific tests performed for each criterion of the checkpoints are not critical to the efficacy of the method, although they may affect the efficiency of the quality check technique. For example, certain orders of performing the quality check may allow the procedure to terminate earlier when a "termination" condition is met, e.g., when a definitive result is reached as to the present status of an occupancy.

In some embodiments, the quality check includes manual validation or verification of an occupancy. For example, if a customer informs the service provider by phone that the customer just moved to a new address, the address is accordingly updated, e.g., its internal score is set to the highest possible value, and its overall indicator is set to "P." With the "aging" of such an update, the score and indicator may be later modified.

In some embodiments, manual verification or validation can also form the basis for other aspects of the quality check technique, which can use the result of a manual verification (or whether there has been a manual verification) as part of a test criterion. Manual verification can be used when externally sourced occupancy data contain some specific types of information or errors that trigger such a manual verification procedure.

Figure 8:
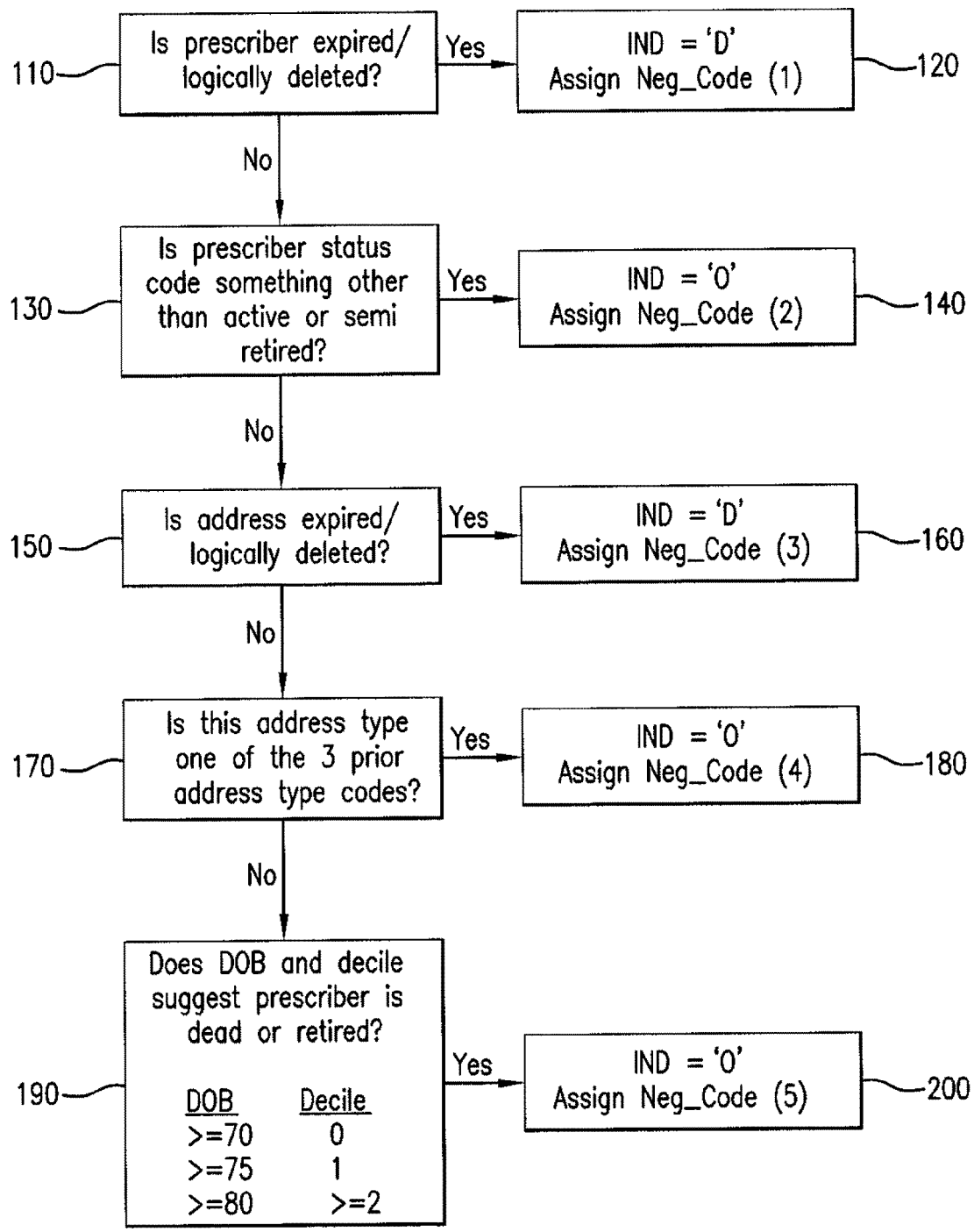
FIG. 8 depicts a diagram relating to evaluating the internal indicator of an occupancy according to some embodiments of the described subject matter.

In some embodiments, the quality check includes updating the present status of an occupancy and/or correcting an error in an occupancy by overriding an initially computed indicator of an occupancy to 'O' or 'D'. For example, it can include checking an occupancy as to whether the person or the address has expired, as illustrated in FIG. 8. At 110, a query is presented for an occupancy of interest: "is prescriber expired or logically deleted?" If the answer is yes (an indication that this particular person should never have been included in the IMS database as he or she is not a professional which IMS maintains information or the record was a mistake or incomplete), the IND variable is assigned a value of 'D' (for "deleted") at 120, NEG_CODE is set to 1, and the quality check terminates. Otherwise (i.e., the answer is no), the occupancy can be further checked at one or more other checkpoints, e.g., 130.

At 130, for example, an occupancy is checked as to whether the prescriber status code is something other than active or semi retired. If the answer is yes, the IND variable is assigned a value of 'O' (for "old") at 140, NEG_CODE is set to 2, and the quality check terminates. Otherwise, the occupancy can be further checked at one or more other checkpoints, e.g., 150.

At 150, for example, an occupancy is tested as to whether its address has expired or logically deleted. If the answer is yes, the IND variable is assigned a value of 'D' at 160, NEG_CODE is set to 3, and the quality check terminates. Otherwise, the occupancy can be further checked at one or more other checkpoints, e.g., 170.

At 170, for example, an occupancy is tested as to whether its address type is one of the three prior address codes (primary mailing, prior home, and prior office). If the answer is yes, the IND variable is assigned a value of 'O' at 180, NEG_CODE is set to 4, and the quality check terminates. Otherwise, the occupancy can be further checked at one or more other checkpoints, e.g., 190.

At 190, for example, an occupancy is tested as to whether its DOB and decile suggest the prescriber is dead or retired. As used herein, "decile" is an indicator of quantity of prescriptions a prescriber wrote in a given period relative to all other prescribers, which can be obtained from a prescription database. For example, decile can be set at levels 0-10, with 5 representing a quantity of prescriptions such that 50% of the prescribers wrote more scripts than this professional and 40% of professionals writing fewer prescriptions. If any of the three combinations of a DOB and a decile at 190 is true, then the answer is yes, the IND variable is assigned a value of 'O' at 200, NEG_CODE is set to 5, and the quality check terminates. Otherwise, the occupancy can be further checked at one or more other checkpoints of the quality check technique.

The formulation of a specific criterion in these embodiments (as illustrated in FIG. 8) can be based either on a manual validation as explained above (e.g., at 110), or a characteristics of the occupancy data itself (e.g., at 190), or both (e.g., at 130).

Figure 9A:
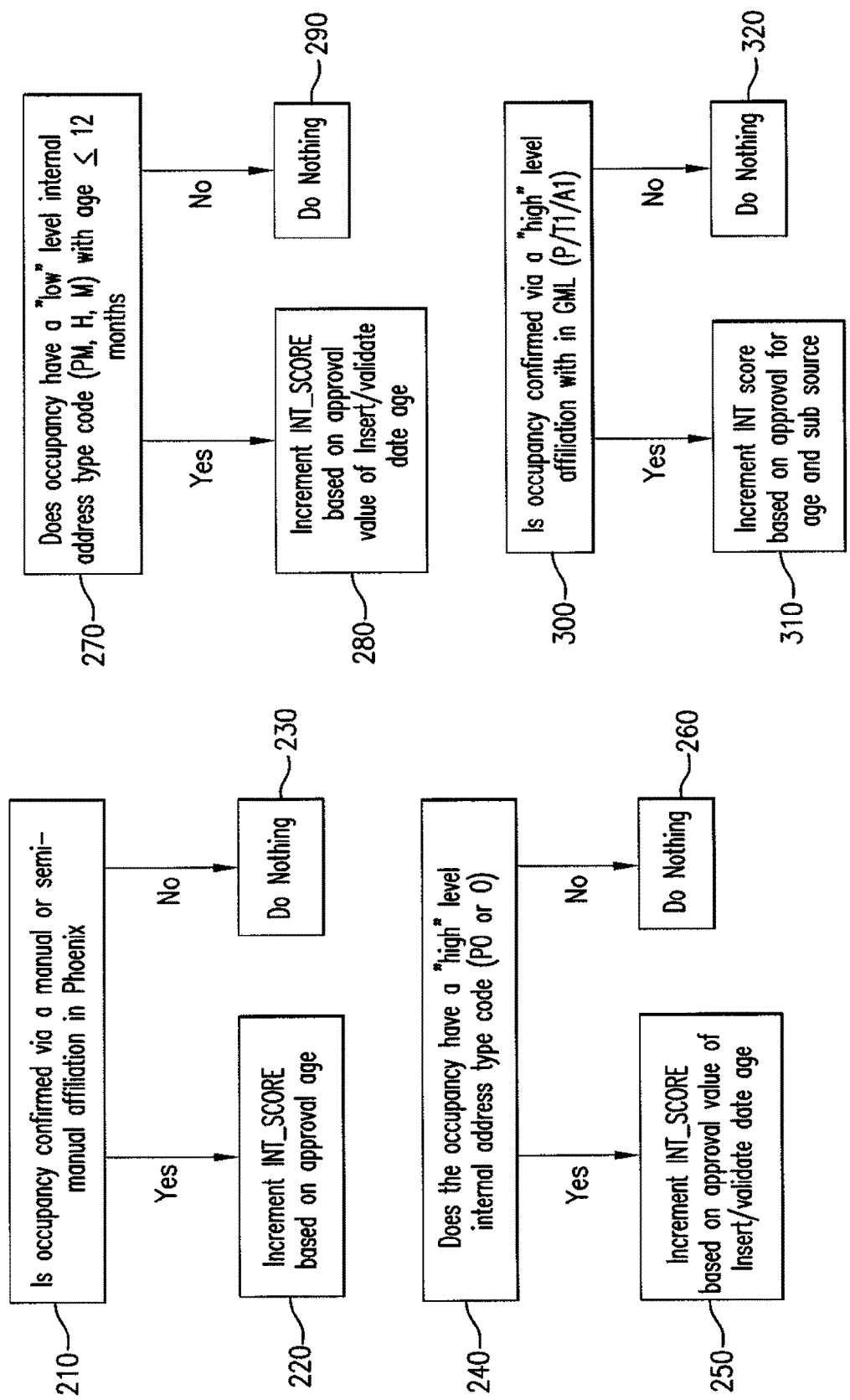
FIG. 9A depicts a diagram relating to evaluating the internal score of an occupancy according to some embodiments of the described subject matter.

In some embodiments, the quality check includes modifying the internal score of an occupancy using a set of criteria. The occupancy can either be externally sourced or internally sourced. FIG. 9A illustrates this aspect of the quality check technique. At 210, the quality check tests whether the occupancy is confirmed via a manual or semi manual affiliation in a tool/database for tracking the organizational affiliation of a professional (e.g., the PHOENIX™ database available from IMS Health). If the answer is yes, the internal score is incremented at 220 from a previous value (e.g., the default value of 0) based on the internal approval age of the occupancy, which indicates the time lapse since the last time when this occupancy was confirmed by an analyst by direct call, email, etc., with the person. If the answer is no, the internal score is not updated (at 230).

At 240, for example, an occupancy is tested as to whether it has a high level internal address type code, namely, primary office ('PO') or 'office' ('O'). "Internal address type" as used herein refers to the address type assigned to an occupancy either based on the source where the occupancy is obtained, which can be later validated by an analyst using manual validation. The internal score is incremented at 250 from the previous value based on the internal approval age of the occupancy. If the answer is no, the internal score is not updated (at 260).

At 270, for example, an occupancy is tested as to whether it has a low internal address type level, e.g., preferred mailing ('PM'), home ('H'), and mailing ('M'), with an approval age less than or equal to 12 months. If the answer is yes, the internal score is incremented at 280 from the previous value based on the internal approval age of the occupancy. If the answer is no, the internal score is not updated (at 290).

At 300, for example, an occupancy is tested as to whether it is confirmed via a high level affiliation with GML, e.g., P/T1/A1. GML is an external data claims data source that contains not only a professional address, but also the organizational affiliation and the affiliation type field, which is used to describe the recency and accuracy of the affiliation. If the answer is yes, the internal score is incremented at 310 from the previous value based on the internal approval age of the occupancy. If the answer is no, the internal score is not updated (at 320).

In some embodiments, the concept for internal scoring mirrors the concepts for external scoring. For example, there are two major internal sources, such as MI CORE™ and PHOENIX™. Within each source there are different "sub sources" representing different types of manually based verification. From PHOENIX™, the three techniques indicate whether the result is based off of a manual phone call (RT), an analyst verifying results from a web-site after a telephone call to the organization to verify the contents of the web site are current (FL) or whether the web sites contents were automatically updated into the database after a telephone call to the organization to verify the contents of the web site are current (BFL). For MI CORE™, the six variations and relative points are based on when the address was inserted by a user, the person was marked as validated or the occupancy was marked as Manually Verified and whether the address was marked as an OFFICE or PRIMARY OFFICE. Based on the dates when any of these activities for PHOENIX™ or MI CORE™ took place and approval age and score are assigned. FIG. 9B represents a portion of an exemplary table summarizing the weight points that can be assigned based on the different sources, sub sources, and approval age.

In one embodiment, the internal rank and internal indicator of an occupancy can be updated using the updated internal score. This can be done in a similar manner as the case for deriving the external indicator from an external score. An exemplary conversion table is illustrated in FIG. 9C.

Figure 10A:
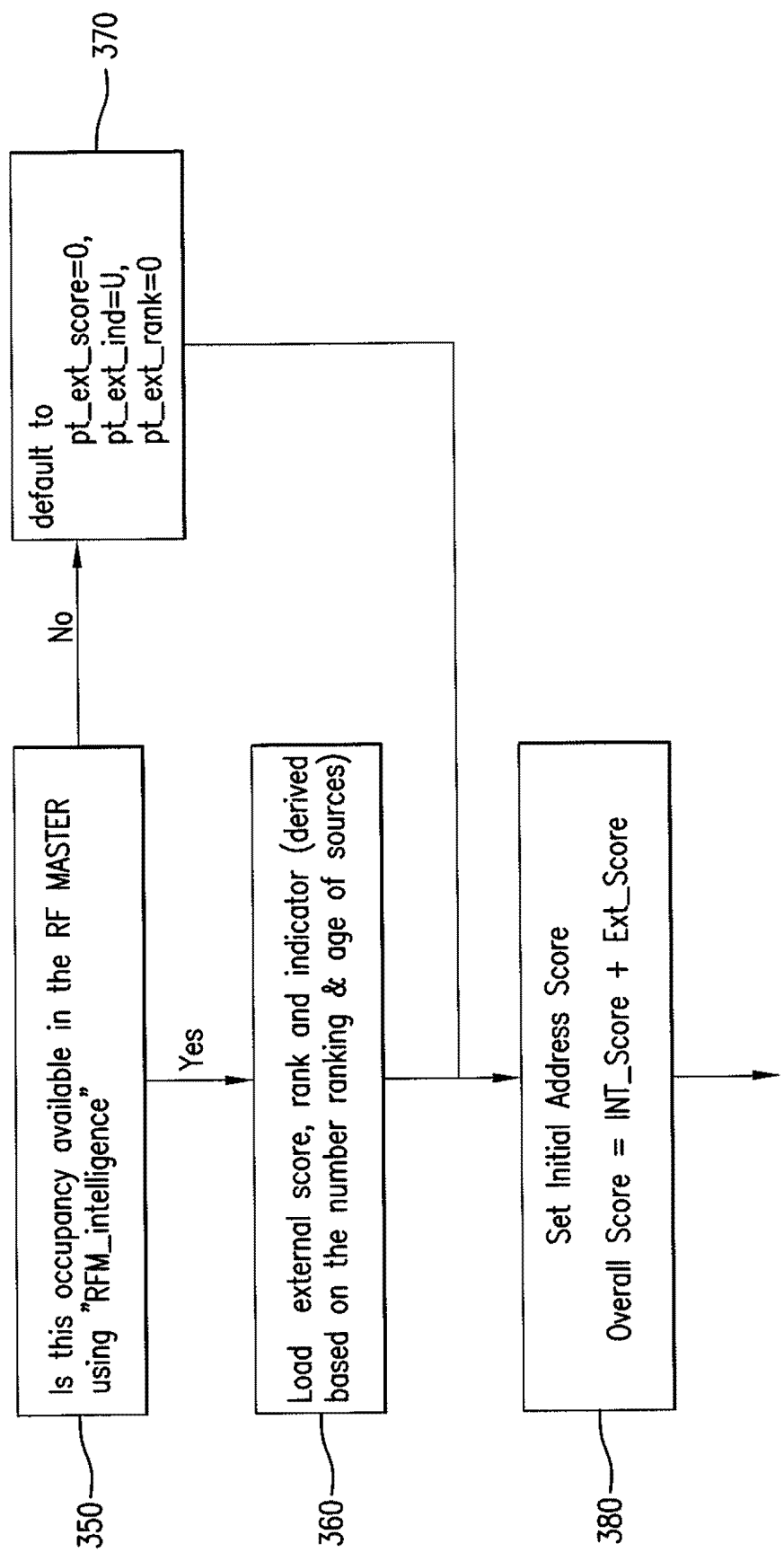
FIG. 10A depicts a diagram relating to deriving an overall score of an occupancy according to some embodiments of the described subject matter.

In some embodiments, the quality check technique includes combining the internal and external score of an occupancy to derive an overall score of the occupancy. The overall score of an occupancy can then be used to compute an overall indicator with an improved reliability relative to the internal indicator and the external indicator alone. FIG. 10A illustrates an example for implementing this aspect of the quality check technique. An occupancy is first obtained from the expanded database table combining REFERENCE FILE MASTER and MI CORE™. At 350, the quality check technique tests whether the occupancy is available in the REFERENCE FILE MASTER using the table "RFM_intelligence" (the summary table created at the end of SOURCE COMPARE procedure, see FIG. 7). If the answer is yes, the external score, rank and indicator stored for the corresponding occupancy in the table are imported (at 360); otherwise, the external score, indicator, and rank of the occupancy are set at 370 to their default values, e.g., 0, 'U' (for "unknown"), and 0, respectively. Subsequently, at 380, an overall score of the occupancy is computed as the sum of the internal score and the external score. The overall score can be used to compute an overall rank (e.g., from −6 to 10) and an overall indicator (e.g., 'P', 'A', 'T', 'U', 'O', 'D', etc.). FIG. 10B presents an example of how the overall score can be used to derive an overall rank and an overall indicator.

Figure 11:
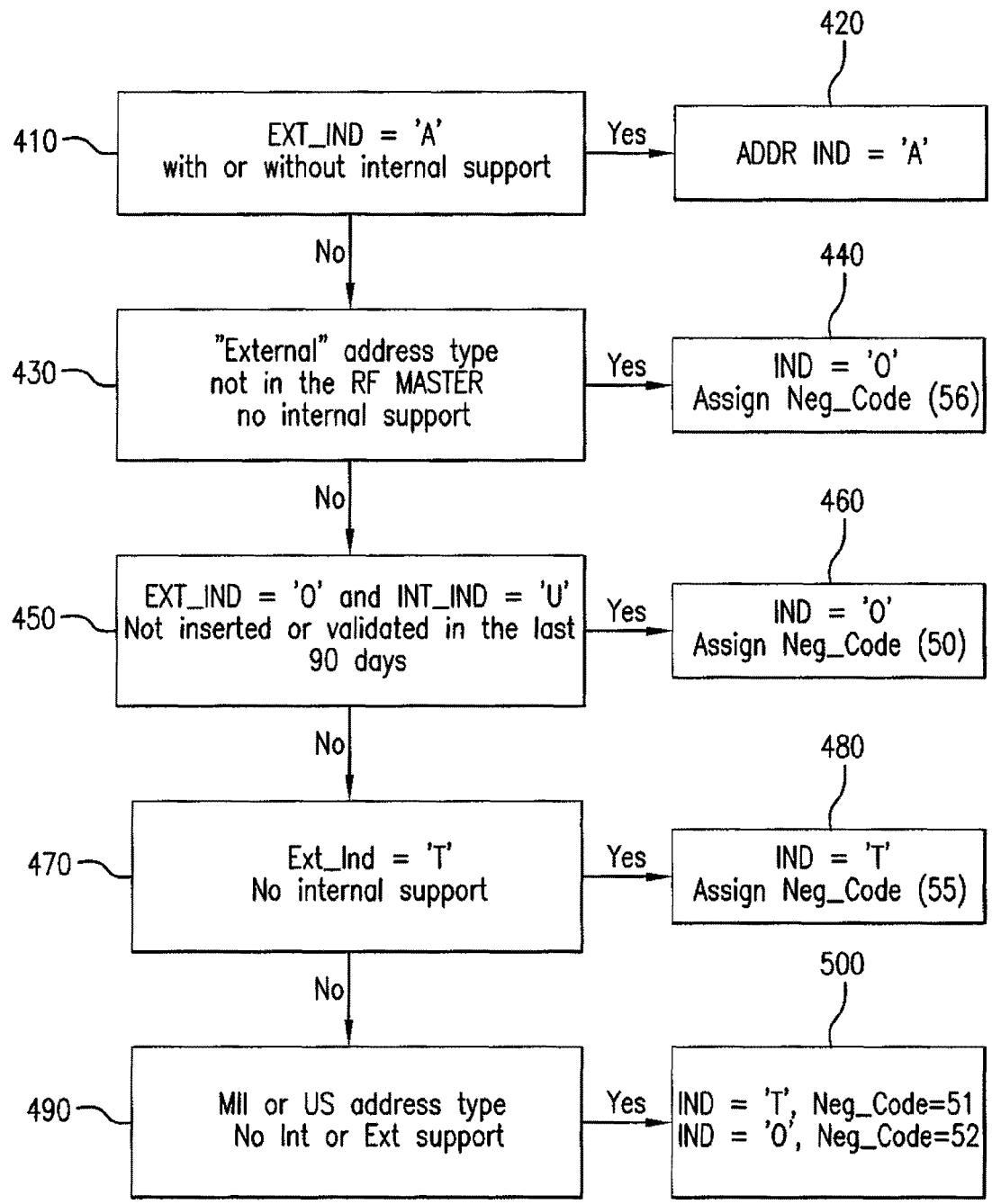
FIG. 11 depicts a diagram relating to evaluating the overall indicator of an occupancy according to some embodiments of the described subject matter.
Figure 11:
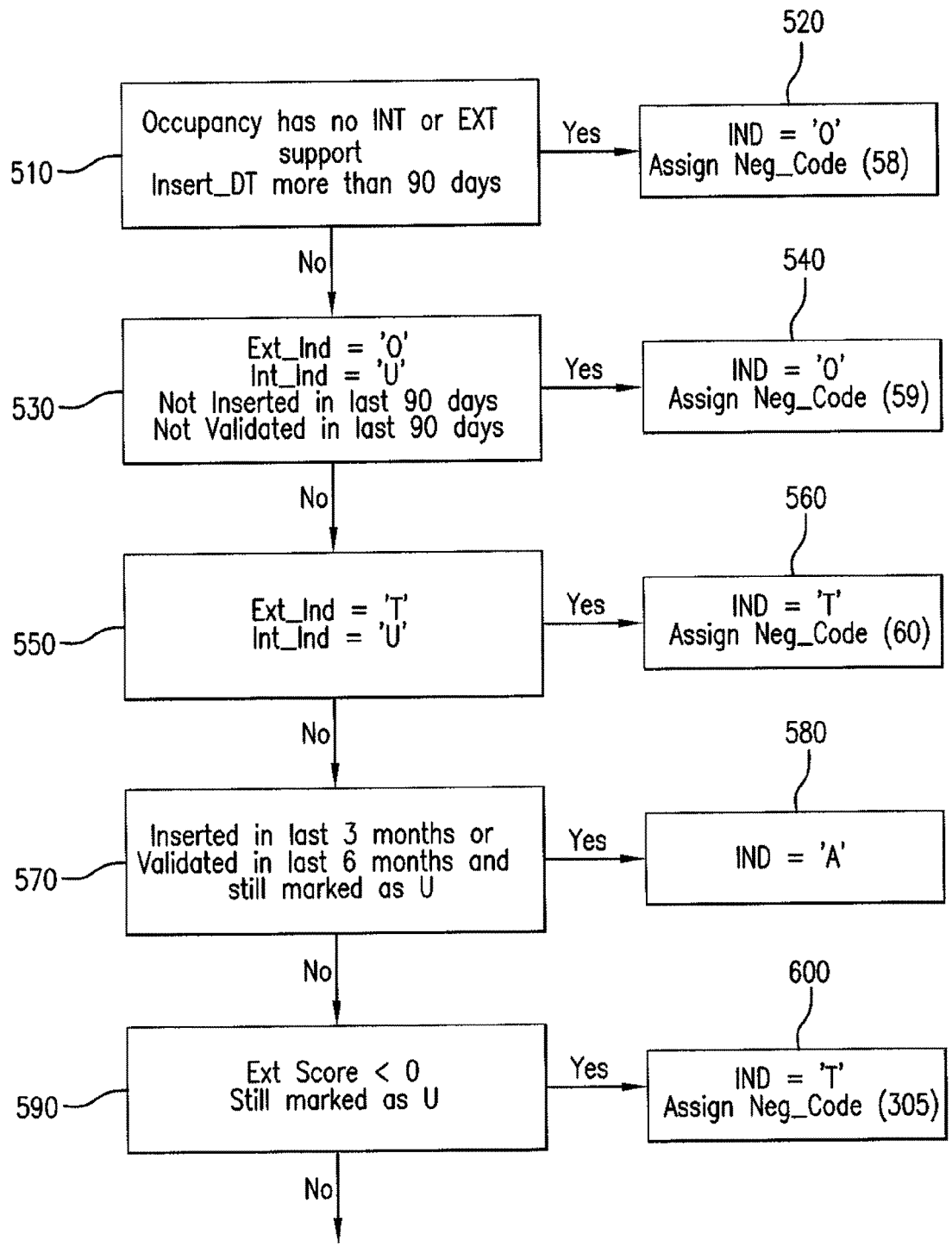

In some embodiments, the quality check includes evaluating the overall indicator of an occupancy based on a set of criteria based on the external and/or internal score, and/or external and/or internal indicator, among others factors reflecting the internal update history of the occupancy. FIG. 11 illustrates a way of implementing this aspect of the quality check technique. At 410, the quality check technique tests whether the external indicator of the occupancy is 'A' (with or without internal support). If the answer is yes, at 420, the overall indicator value is set as 'A', and the quality check terminates. If the answer is no, the occupancy can be further checked at one or more other checkpoints, e.g., 430.

At 430, for an occupancy of interest, the quality check technique tests whether this criterion is satisfied: "Is the occupancy has an external address type, and is not in the REFERENCE FILE MASTER, and has no internal support?" As used herein, "internal support" means that an occupancy has been confirmed or validated by an analyst using some manual checks, e.g., via telephone, email, or other means of communication with the person of the occupancy. If the answer is yes, at 440, the overall indicator value is set to 'O', the NEG_CODE is set to 56, and the quality check terminates. If the answer is no, the occupancy can be further checked at one or more other checkpoints, e.g., 450.

At 450, for example, for an occupancy of interest, the quality check technique tests whether this criterion is satisfied: "Is the external indicator of the occupancy 'O', its internal indicator 'U', and the occupancy was not inserted or validated in the last 90 days?" If the answer is yes, at 460, the overall indicator value is set to 'O', the NEG_CODE is set to 50, and the quality check terminates. If the answer is no, the occupancy can be further checked at one or more other checkpoints, e.g., 470.

At 470, for example, an occupancy is tested as to whether its external indicator is 'T' and that it has no internal support. If the answer is yes, at 480, the overall indicator is set to 'T', the NEG_CODE is set to 55, and the quality check terminates. If the answer is no, the occupancy can be further checked at one or more other checkpoints, e.g., 490.

At 490, for example, an occupancy is tested as to whether it has a MII or US address type and no internal support. (In one embodiment, MII represents an address originally based on an affiliation in PHOENIX™ that no longer exists. US represents a user attempt to verify an address that was unsuccessful. The address could not be confirmed as old or invalid but it is strongly suspected as such.) If the answer is yes, at 500, the overall indicator is set to 'T' (for MII address type) or 'O' (for US address type), with the corresponding NEG_CODE set to 51 or 52, and the quality check terminates. If the answer is no, the occupancy can be further checked at one or more other checkpoints, e.g., 510.

At 510, for example, an occupancy is tested as to whether it has no internal or external support, and has the internal insert date of more than 90 days. The term "external support" as used herein refers to the presence or availability of an external source from which the occupancy is obtained and the age of the occupancy can be determined. If the answer is affirmative, at 520, the overall indicator is set to 'O', the NEG_CODE is set to 58, and the quality check terminates. If the answer is negative, the occupancy can be further checked at one or more other checkpoints, e.g., 530.

At 530, for example, an occupancy is tested against this criterion: "Are the following conditions all true: the external indicator of the occupancy is 'O'; the internal indicator of the occupancy is 'U'; the occupancy was not inserted in the last 90 days; and the occupancy was not validated in the last 90 days." If the answer is affirmative, at 540, the overall indicator is set to 'O', the NEG_CODE is set to 59, and the quality check terminates. If the answer is negative, the occupancy can be further checked at one or more other checkpoints, e.g., 550.

At 550, for example, an occupancy is tested as to whether its external indicator is 'T' while its internal indicator is 'U'. If the answer is yes, at 560, the overall indicator is set to 'T', the NEG_CODE is set to 60, and the quality check terminates. If the answer is no, the occupancy can be further checked at one or more other checkpoints, e.g., 570.

At 570, for example, an occupancy is tested as to whether it was inserted in the last 3 months or validated in the last six months and still marked as 'U'. If the answer is yes, at 580, the overall indicator is set to 'A', and the quality check terminates. If the answer is no, the occupancy can be further checked at one or more other checkpoints, e.g., 590.

At 590, for example the occupancy is tested as to whether it was inserted in the last 3 months or validated in the last six months and still marked as 'U'. If the answer is yes, at 600, the overall indicator is set to 'T', the NEG_CODE is set to 305, and the quality check terminates. If the answer is no, the occupancy can be further checked at one or more other checkpoints, e.g., 610, as explained below.

Figure 12:
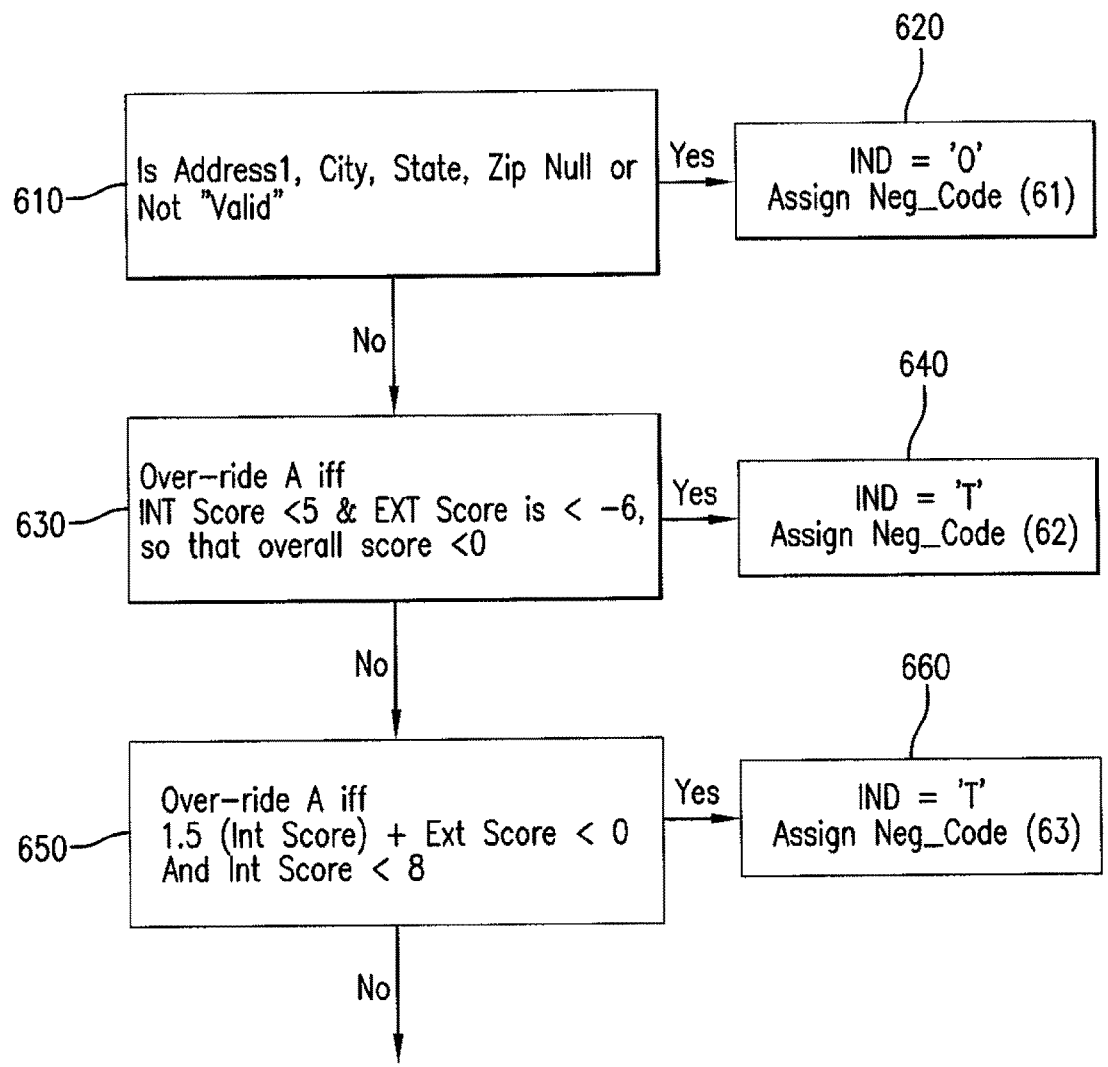
FIG. 12 depicts a diagram relating to evaluating the overall indicator of an occupancy according to some embodiments of the described subject matter.

In some embodiments, the quality check technique includes evaluating the validity of a previous determination of an overall indicator having an 'A' value. FIG. 12 illustrates an embodiment for implementing this aspect of the quality check technique. At 610, for example, an occupancy is tested as to whether any portion of its address has a 'NULL' or 'INVALID' value. If the answer is yes, at 620, the overall indicator is set to 'O', the NEG_CODE is set to 61, and the quality check terminates. If the answer is no, the occupancy can be further checked at one or more other checkpoints, e.g., 630, as explained below.

At 630, the occupancy is tested as to whether its internal score is less than 5 while its external score is less than −6. If the answer is yes, at 640, the overall indicator is set to 'T' (i.e., 'A' is overridden), the NEG_CODE is set to 62, and the quality check terminates. If the answer is no, the occupancy can be further checked at one or more other checkpoints, e.g., 650.

At 650, for example, an occupancy is tested as to whether the sum of 1.5× its internal score and its external score is smaller than zero, while the internal score is smaller than 8. If the answer is yes, at 660, the overall indicator is set to 'T', the NEG_CODE is set to 63, and the quality check terminates. If the answer is no, the occupancy can be further checked at one or more other checkpoints, e.g., 670.

The formulation of a specific criterion in the above embodiments can be based either solely on the external indicator (e.g., at 410), whether there has been a prior manual validation (e.g., at 570), or a mixture of both (e.g., at 530).

Figure 13:
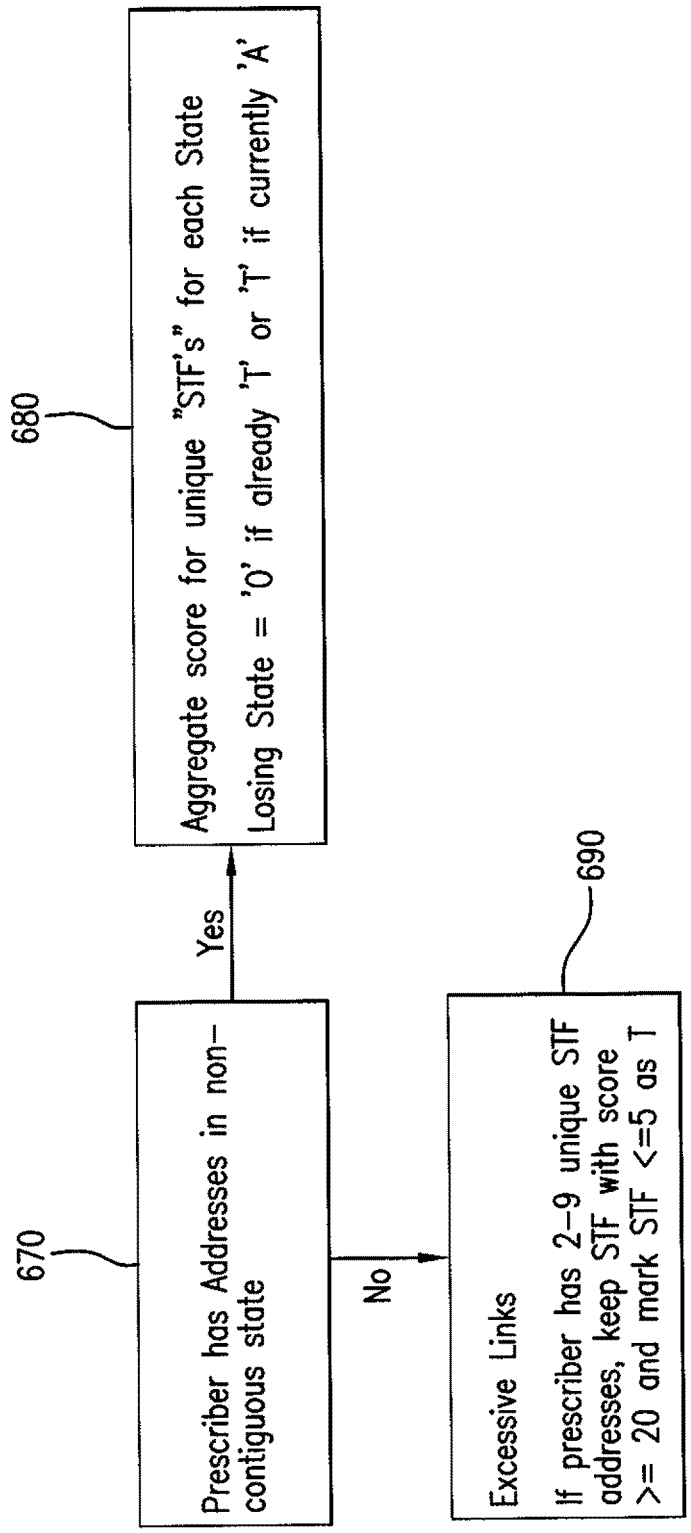
FIG. 13 depicts a diagram relating to evaluating the overall indicators of multiple occupancies associated with a person according to some embodiments of the described subject matter.

In some embodiments, the quality check includes resolving a conflict existent in the occupancy data. For example, it can include evaluating multiple addresses in non-contiguous states for a physician, because such a situation is unlikely and usually caused by errors in the reporting external sources. FIG. 13 illustrates an embodiment implementing this aspect of the quality check technique. At 670, the quality check technique tests whether a prescriber has multiple addresses in non-contiguous states. If the answer is yes, at 680, the score for unique street front (STF) addresses for each state is aggregated, and the overall indicator for the losing state (i.e., the state with a lower aggregate STF score) is updated to 'O' if it is currently 'T', or updated to 'T' if it is currently 'A'; and then the quality check terminates. If the answer is no, the occupancy can be further checked at one or more other checkpoints, e.g., 690.

At 690, for example, the prescriber associated with an occupancy is tested as to whether he or she has 2-9 unique STF addresses. If the answer is yes, the overall indicator for each of the unique STF occupancies is retained if the indicator is greater or equal to 20, and the overall indicator for each of the unique SFT occupancies is updated from 'A' to 'T' if smaller or equal to 5.

After the one or more occupancies for a person of interests are obtained and processed according to the described techniques, they can be presented to a user, optionally together with the determined present status (e.g., represented by an overall score, rank and/or indicator) for the occupancy or occupancies, in a user readable format. FIG. 14 is an illustrative portion of a table (in a spreadsheet) that can be presented to a user.

Any suitable form of presentation is contemplated. For example, the presentation can be made in an electronic format to facilitate any desired sorting by rank, indicator, or other fields or attributes of the occupancies. All of the occupancies for a person can be presented, or only some occupancies that are above certain threshold in terms of rank or indicator can be presented, depending on the user's need or request. For example, where only the most preferred occupancies for a person (e.g., those satisfy a condition of a high rank, a high-end indicator, or a combination of both) are desired or requested by the user, the presentation includes not presenting the occupancy or occupancies that do not satisfy the given condition. Based on the presented rank and indicator of an occupancy, the user can readily note the currency and the reliability of the occupancy, thus can be empowered to make informed decision as to how to utilize the occupancy. Multiple occupancies associated of multiple persons can be similarly presented after the occupancies are obtained and processed by the address intelligence techniques.

Other useful attributes of an occupancy can be included in the presentation. For example, an occupancy can include type and category information, e.g., home address or a professional location. Further refinement is available to assign a category of professional office, such as Institutional, Outpatient or Nursing Home. These attributes can be obtained either directly from the external or internal sources, or through the application of some aspects of the address intelligence techniques. A series of examples for the occupancy 'type' are illustrated in FIG. 2.

The techniques of the described subject matter can be implemented on a computer apparatus, special purpose hardware, or computers in a client/server environment that includes one or more processors, memory, input devices, output devices, communication devices and networks, and data storage devices (e.g., computer readable media) using software or firmware programmed to implement the techniques.

In some embodiments, instructions embodying the described techniques can be included in a computer readable medium, such as a DVD, CD, hard disk, nonvolatile memory, computer chip, or the like. The computer apparatus can include the computer readable medium. The computer apparatus can include processors in communication with the computer readable medium to receive the instructions embodied thereon. The processors can be in communication with one or more memories for storing and/or accessing data for the techniques. The data can include one or more of the tables or other data of the described techniques. The computer apparatus can also include multiple processors, processing the described techniques in parallel or processing the described techniques in a separable manner such that a first one or more processors can process a first portion of the techniques while a second one or more processors processes a second portion of the techniques.

The results of the techniques can be stored in a memory, such as a database, as appropriate. Alternatively, the results can be provided to another entity, such as a customer, in any appropriate format, such as a data file, physical representation (e.g., on paper), or the like. The results can be delivered over one or more networks to the other entity as appropriate.

The techniques include one or more software applications for implementing the described techniques. The separation of software applications can be done in any appropriate manner, such as designating a first software application to calculate the weights and ranks as described above and a second application to assign the indicators and to perform the remainder of the processing. The processing for a software application can be distributed across multiple processors and/or computer apparatuses or be embodied in a single processor or computer apparatus (in the latter multiple processors and computer apparatuses can work together to accomplish the described techniques).

It should be noted that an address/occupancy can represent a physical location of a person or other entity as appropriate.

The foregoing merely illustrates the principles of the described subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the described subject matter and are thus within the spirit and scope of the described subject matter.

The invention claimed is:

1. A method comprising:
   obtaining a plurality of occupancy location identifiers for an individual from one or more sources;
   obtaining an age of each of the plurality of occupancy location identifiers;
   assigning, by one or more computer processors, a weight point to each of the plurality of occupancy location identifiers based on the obtained age of each of the plurality of occupancy location identifiers and a relative trustworthiness of the source from which each of the plurality of occupancy location identifiers was obtained;
   determining, by the one or more computer processors, a confidence score for each of the occupancy location identifiers based on the assigned weight point of each of the plurality of occupancy location identifiers; and
   determining a present status of each of the plurality of occupancy location identifiers based on the determined confidence score.

2. The method of claim 1, wherein obtaining the plurality of occupancy location identifiers comprises obtaining at least one of the plurality of occupancy location identifiers from one or more external sources.

3. The method of claim 1, wherein determining the present status of each of the plurality of occupancy location identifiers comprises computing an indicator for each of the plurality of occupancy location identifiers.

4. The method of claim 1, wherein determining the present status of each of the plurality of occupancy location identifiers comprises computing a rank for each of the plurality of occupancy location identifiers.

5. The method of claim 1, further comprising performing a quality check to refine the determined confidence score occupancy for each of the occupancy location identifiers.

6. The method of claim 5, wherein the quality check includes manual validation of at least one of the plurality of occupancy location identifiers.

7. The method of claim 5, wherein the quality check includes resolving a conflict of occupancy data of the individual existent in said one or more sources.

8. The method of claim 1, wherein the confidence score is an overall score and determining the score comprises combining an internal score and an external score of each of the plurality of occupancy location identifiers, the internal score being associated with one or more of the plurality of occupancy location identifiers obtained from one or more internal sources and the external score being associated with one or more of the plurality of occupancy location identifiers obtained from one or more external sources.

9. The method of claim 8, wherein determining said present status of each of the plurality of occupancy location identifiers comprises computing an overall indicator for each of the plurality of occupancy location identifiers, the overall indicator reflecting said present status of the corresponding occupancy location identifier.

10. The method of claim 9, further comprising performing a quality check on the computed overall indicators, the quality check including evaluating each of the overall indicators based on update history of the corresponding occupancy location identifier.

11. The method of claim 9, further comprising performing a quality check on the computed overall indicators, the quality check including evaluating the validity of a previous determination of each of the overall indicators of each of the plurality of occupancy location identifiers.

12. The method of claim 1, further comprising presenting the plurality of occupancy location identifiers in a user readable format.

13. The method of claim 12, wherein presenting the plurality of occupancy location identifiers includes presenting the determined present status determined for each of the occupancy location identifiers.

14. The method of claim 12, wherein presenting the plurality of occupancy location identifiers includes presenting the plurality of occupancy location identifiers based on said determined present status of each of the plurality of occupancy location identifiers.

15. A non-transitory computer-readable medium comprising instructions that, when executed by one or more processors, cause the one or more processors to perform operations comprising:
  obtaining a plurality of occupancy location identifiers for an individual from one or more sources;
  obtaining an age of each of the plurality of occupancy location identifiers;
  assigning, by one or more computer processors, a weight point to each of the plurality of occupancy location identifiers based on the obtained age of each of the plurality of occupancy location identifiers and a relative trustworthiness of the source from which each of the plurality of occupancy location identifiers was obtained;
  determining, by the one or more computer processors, a confidence score for each of the occupancy location identifiers based on the assigned weight point of each of the plurality of occupancy location identifiers; and
  determining a present status of each of the plurality of occupancy location identifiers based on the determined confidence score.

16. A system comprising:
  one or more processors,
  a memory operably coupled with the one or more processors storing instructions which, when executed by the one or more processors, perform a method comprising:
    obtaining a plurality of occupancy location identifiers for an individual from one or more sources;
    obtaining an age of each of the plurality of occupancy location identifiers;
    assigning, by one or more computer processors, a weight point to each of the plurality of occupancy location identifiers based on the obtained age of each of the plurality of occupancy location identifiers and a relative trustworthiness of the source from which each of the plurality of occupancy location identifiers was obtained;
    determining, by the one or more computer processors, a confidence score for each of the occupancy location identifiers based on the assigned weight point of each of the plurality of occupancy location identifiers; and
    determining a present status of each of the plurality of occupancy location identifiers based on the determined confidence score.

17. The system of claim 16, further comprising a display device operably coupled with said one or more processors for presenting the plurality of occupancy location identifiers in a user readable format.

* * * * *